United States Patent
Suzuki et al.

(10) Patent No.: US 8,299,364 B2
(45) Date of Patent: Oct. 30, 2012

(54) GROMMET

(75) Inventors: Takashi Suzuki, Yokkaichi (JP);
Morihiko Toyozumi, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 314 days.

(21) Appl. No.: 12/867,941

(22) PCT Filed: May 27, 2008

(86) PCT No.: PCT/JP2008/059700
§ 371 (c)(1),
(2), (4) Date: Aug. 17, 2010

(87) PCT Pub. No.: WO2009/104286
PCT Pub. Date: Aug. 27, 2009

(65) Prior Publication Data
US 2010/0314158 A1 Dec. 16, 2010

(30) Foreign Application Priority Data
Feb. 20, 2008 (JP) .................. 2008-038175

(51) Int. Cl.
*H02G 3/22* (2006.01)
(52) U.S. Cl. ............... 174/152 G; 174/153 G; 174/151; 16/2.1; 248/56
(58) Field of Classification Search ............ 174/153 G, 174/151, 152 G, 135; 439/274, 275; 248/56; 16/2.1, 2.2
See application file for complete search history.

(56) References Cited

U.S. PATENT DOCUMENTS

| | | | |
|---|---|---|---|
| 6,442,794 B2 | 9/2002 | Uchida et al. | |
| 6,479,748 B2 * | 11/2002 | Mori | 174/651 |
| 6,680,437 B2 | 1/2004 | Sato | |
| 7,020,931 B1 * | 4/2006 | Burnett et al. | 16/2.2 |
| 7,420,125 B2 * | 9/2008 | Tsukamoto et al. | 174/153 G |
| 7,659,480 B2 * | 2/2010 | Bikhleyzer | 174/153 G |
| 8,108,968 B2 * | 2/2012 | Pietryga et al. | 16/2.2 |
| 2003/0015338 A1 | 1/2003 | Sato | |

FOREIGN PATENT DOCUMENTS

| | | |
|---|---|---|
| JP | 61120123 | 7/1986 |
| JP | 9-289723 | 11/1997 |
| JP | 2003-32857 | 1/2003 |

* cited by examiner

*Primary Examiner* — Dhirubhai R Patel
(74) *Attorney, Agent, or Firm* — Greenblum & Bernstein P.L.C.

(57) ABSTRACT

A grommet includes a smaller diameter tubular section, an increasing diameter tubular section, and a larger diameter tubular section. The smaller diameter tubular section is connected through the increasing diameter tubular section to the larger diameter tubular section in an axial direction. A U-shape folded portion is provided on a connecting portion (a middle diameter tubular section) between the smaller diameter tubular section and the increasing diameter tubular section. A flap section that spreads conically toward the increasing diameter tubular section is provided on an outer periphery of the smaller diameter tubular section or an outer periphery of the folded portion. The folded portion is stretched straightly when the grommet is inserted into a through-hole. When a vehicle body latching recess is engaged with a peripheral edge around the through-hole, the folded portion returns to the original shape, and a distal end peripheral edge of the flap section contacts with a vehicle body panel at a passenger room side to define a sound absorbing closed space.

2 Claims, 5 Drawing Sheets

FIG.6 (Prior Art)
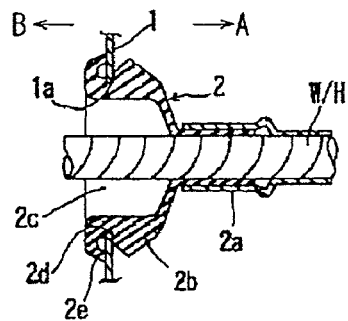
FIG.7A (Prior Art)
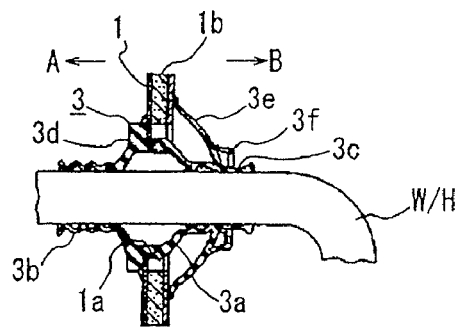
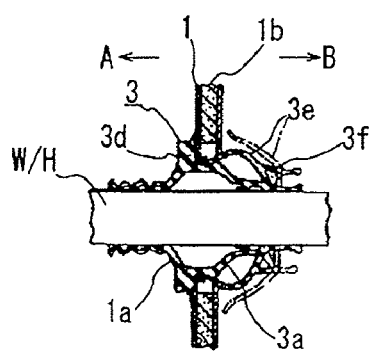
FIG.7B (Prior Art)

GROMMET

FIELD OF THE INVENTION

This invention relates to a grommet to be attached to a through-hole in a vehicle body of a motor vehicle with the grommet passing a wire harness and more particularly relates to a grommet that is mounted in a through-hole in a panel between an engine room side and a passenger room side to insulate the passenger room side from noises generated from the engine room side and to improve workability in an attaching work to a vehicle body.

BACKGROUND OF THE INVENTION

A through-hole is provided in a vehicle body panel (dash panel) for partitioning an engine room side and a passenger room side in a motor vehicle. In the case where a wire harness is passed through the through-hole and is wired in the vehicle body, a grommet made of rubber or elastomer is mounted on the wire harness and is disposed between the wire harness and the through-hole to protect the wire harness and to carry out waterproofing, soundproofing, and dustproofing from the engine room side to the passenger room side.

An example of a grommet 2 shown in FIG. 6 has been used generally. The grommet 2 includes a smaller diameter tubular section 2a, a larger diameter tubular section 2b connected to an end of the smaller diameter tubular section 2a, and a wire harness passing section 2c in a hollow space along an axial direction of the sections 2a and 2b. The larger diameter tubular section 2b is provided on an outer periphery with a vehicle body latching recess 2d. The recess 2d is provided on side end with a lip 2e. The grommet 2 seals a through-hole 1a in a vehicle body 1 by press-contacting the lip 2e to the vehicle body 1.

When the grommet 2 is inserted from the engine room side A through the through-hole 1a to the passenger room side B, the lip 2e is deflected to catch a bottom surface of the vehicle body latching recess 2d and an inner peripheral surface around the through-hole 1a. This will cause the grommet 2 to be mounted on the vehicle body 1 incorrectly. Consequently, after the whole of the larger diameter tubular section 2b is inserted into the through-hole 1a and is pushed into the passenger room side B temporarily, the section 2b is pulled back again to engage the vehicle body latching recess 2d with the through-hole 1a, thereby preventing the lip 2e from catching the surfaces.

However, since a strong force is required to force the larger diameter tubular section 2d to be inserted into the passenger room side B, workability will be lowered significantly and efficiency in an attaching work will be lowered. Since the grommet 2 shown in FIG. 6 is not provided with a sound insulation means for preventing and restraining noises from being transmitted from the engine room side to the passenger room side, the grommet cannot reply to a demand for quiet in the passenger room side.

In order to overcome the above problems, JP HEI 3 (1991)-9214 U (Patent Document 1) has proposed a grommet 3 shown in FIGS. 7A and 7B. The grommet 3 is provided with a dual seal structure that exerts sound insulation.

The grommet 3 is attached to a through-hole 1a in a vehicle body panel 1 on which a sound insulation material 1b is laminated at a passenger room side B. The grommet 3 includes a first tubular seal section 3d that seals the through-hole 1a at an engine room side A and a second flange-like seal section 3e that seals an opening of the sound insulation material 1b opposed to the through-hole 1a, a larger diameter tubular section 3a, and smaller diameter tubular sections 3b and 3c that protrude from an outer periphery of the larger diameter tubular section 3a to clamp a wire harness W/H onto opposite ends of the larger diameter tubular section 3a. The second seal section 3e is provided at on a surface at the passenger room side B with a projection 3f that can be held by a tool.

As shown in FIG. 7B, when the grommet 3 is attached to the through-hole 1a, the grommet 3 together with the wire harness W/H is inserted into the through-hole 1a from the engine room side A, the first seal section 3d is brought into contact with the vehicle body panel 1 and the projection 3f of the second seal section 3e is protruded from the through-hole 1a to the passenger room side B. Then, the projection 3f is pulled from the passenger room side B, the whole of the second seal section 3e is drawn out from the through-hole 1a, and a peripheral edge of the second seal section 3e is brought into contact with the sound insulation material 1b.

Although the grommet 3 requires no undue pushing work described above upon attachment, it is necessary to simultaneously carry out a work for pushing the wire harness W/H from the engine room side A and a work for pulling the projection 3f from the passenger room side B to draw out the second seal section 3e from the through-hole 1a. This requires a working person at each of the engine room side A and the passenger room side B. This will lower workability.
Patent Document 1: JP HEI 3 (1991)-9214 U

SUMMARY OF THE INVENTION

Problems that the Invention is to Solve

In view of the above problems, an object of the present invention is to provide a grommet having a sound insulation means wherein a work of attaching the grommet to a through-hole in a vehicle body panel can be carried out at one side upon mounting the grommet on a vehicle body, thereby enabling a single working person to effect the attaching work.

Means for Solving the Problems

In order to achieve the above object, the present invention is directed to a grommet comprising a smaller diameter tubular section, an increasing diameter tubular section, and a larger diameter tubular section. The smaller diameter tubular section is connected through the increasing diameter tubular section to the larger diameter tubular section in an axial direction. A wire harness for a motor vehicle is passed through the smaller and larger diameter tubular sections. The grommet is inserted into a through-hole in a vehicle body. A vehicle body latching recess is engaged with a peripheral edge around the through-hole. A U-shape folded portion is provided on a connecting portion between the smaller diameter tubular section and the increasing diameter tubular section. A flap section that spreads conically toward the increasing diameter tubular section is provided on an outer periphery of the smaller diameter tubular section or an outer periphery of the folded portion. The folded portion is stretched straightly when the grommet is inserted into the through-hole. When the vehicle body latching recess is engaged with the peripheral edge around the through-hole, the folded portion returns to the original shape, and a distal end peripheral edge of the flap section contacts with a vehicle body panel at a passenger room side to define a sound absorbing closed space.

As described above, since the folded portion is stretched straightly when the grommet is attached to the through-hole in the vehicle body, a distance between the flap section and the increasing diameter tubular section can be widened temporarily, and it is possible to prevent the peripheral edge of the flap section from being caught between the peripheral edge around the through-hole and the increasing diameter tubular section.

Since the folded portion is stretched straightly, it is possible for the flap section to pass the through-hole and to push the flap section toward the passenger room side, even if the larger diameter tubular section is not pushed into the through-hole until the larger diameter tubular section passes the through-hole. After pushing the flap section, it is possible to engage the vehicle body latching recess with the through-hole at the distal end side of the larger diameter tubular section pushed into the through-hole. That is, it is possible to pass the flap section to the side surface of the passenger room side by one-way action (so-called one-motion) of pushing the grommet and to engage the vehicle body latching recess with the peripheral edge around the through-hole. Under this condition, in order to enable the flap section to contact with the side surface of the passenger room, the grommet can be merely pulled in the opposite direction. Only one working person at the engine room side can attach the grommet to the through-hole. Thus, since the attaching work of the grommet is not carried out in the passenger room side, it is possible to reduce the number of working persons.

In the grommet disclosed in Patent Document 1, the larger diameter tubular section as well as the flap section must be pushed from the through-hole to the passenger room side by a strong force so that the flap section (sound insulation material) passes the through-hole. However, in the grommet of the present invention, since a light force can pass the flap section through the through-hole, it is possible to reduce a load of the working person.

Specifically, the flap section protrudes from the outer periphery on the connecting portion between the smaller diameter tubular section and the increasing diameter tubular section. A middle diameter tubular section having a diameter greater than that of the smaller diameter tubular section is provided on a proximal end of the flap section. A distal end of the middle diameter tubular section is returned back in the axial direction to form a U-shape folded portion. The increasing diameter tubular section is connected to an outer peripheral end of the folded portion.

Alternatively, the folded portion protrudes outward in a direction orthogonal to the axial direction on the connecting portion between the smaller diameter tubular section and the increasing diameter tubular section. The flap section protrudes from an outer end of the folded portion.

Since the folded portion is stretched straightly in any cases described above, it is possible for the whole of the flap section to pass the through-hole toward the passenger room side.

In the latter case, the folded portion is folded outward in the direction orthogonal to the axial direction of the grommet and the flap section protrudes from the outer end of the folded portion. Consequently, the flap section is pulled and reduced in diameter by the folded portion stretched straightly upon passing the through-hole. Since the distal end peripheral edge of the flap section is reduced in diameter at the same time, it is possible for a light force to pass flap section through the through-hole, even if a diameter of the through-hole is small.

On the other hand, if the folded portion in the former case is provided in the axial direction and is protruded in the hollow space in the increasing diameter tubular section, an outer diameter of the flap section becomes small and this is suitable for the through-hole having a small diameter.

The sound absorbing plate is laminated on the side surface of the vehicle body panel at the passenger room side, and the peripheral edge of the flap section contacts with the sound absorbing plate.

Effects of the Invention

As described above, according to the present invention, since the wire harness is pushed into the through-hole and the folded portion is stretched straightly when the grommet is attached to the through-hole, the whole of the flap section can readily pass through the through-hole toward the passenger room side without catching the flap section between the peripheral edge around the through-hole and the increasing diameter tubular section. Accordingly, in comparison with the prior art grommet in which the larger diameter tubular section is forced to be pushed into the through-hole, it is possible for the present invention to reduce the inserting force and a load of the working person, thereby enhancing workability in attachment.

It is possible to surely attach the grommet of the present invention to the vehicle body merely by pushing the grommet into the through-hole from the vehicle body panel at the engine room side and to pass the flap section into the passenger room side and to position the flap section in the passenger room side. Accordingly, since it is not necessary to carry out the attaching work at the passenger room side, only one working person is required for the attaching work at the engine room side. This can reduce the number of working persons and can enhance workability.

BRIEF EXPLANATION OF THE DRAWINGS

FIG. 6 is a longitudinal section view of a prior art grommet.

FIGS. 7A and 7B are longitudinal section views of another prior art grommet.

EXPLANATION OF SIGNS

Figure 1:
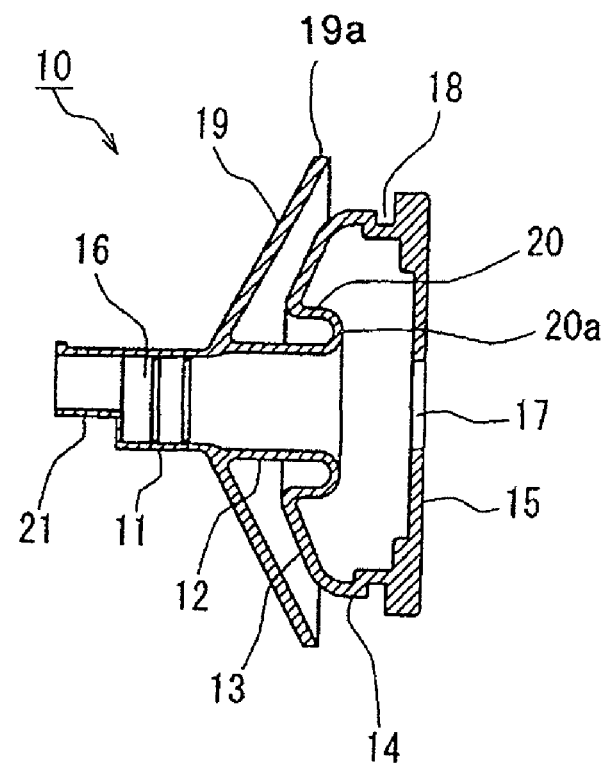
FIG. 1 is a longitudinal section view of a first embodiment of a grommet in accordance with the present invention.

10: grommet
11: smaller diameter tubular section
12: middle diameter tubular section
13: increasing diameter tubular section
14: larger diameter tubular section
19: flap section
20: folded portion
40: vehicle body panel
41: through-hole
42: sound absorbing plate
W/H: wire harness

PREFERRED ASPECTS OF EMBODYING THE INVENTION

Referring now to the drawings, embodiments of a grommet in accordance with the present invention will be described below.

As shown in FIGS. 3A to 3E and 5A to 5E, any embodiments of a grommet 10 in accordance with the present invention is attached to a through-hole 41 provided in a vehicle body panel (dash panel) 40 for partitioning an engine room X and a passenger room Y in a motor vehicle, as is the case with prior art grommets. A sound absorbing plate 42 is laminated on the vehicle body panel 40 at a passenger room side Y. The sound absorbing plate 42 is provided with an inner through-hole 43 communicated with the through-hole 41 in the vehicle body panel 40.

FIGS. 1, 2, and 3A to 3E show a first embodiment of a grommet 10 in accordance with the present invention.

The grommet 10 is a molded product made of rubber or elastomer. As shown in FIG. 1, the grommet 10 includes a smaller diameter tubular section 11, an increasing diameter tubular section 13, and a larger diameter tubular section 14 connected to a larger diameter side of the increasing diameter tubular section 13. A flap section 19 protrudes from an outer periphery of the smaller diameter tubular section 11 between the section 11 and the increasing diameter tubular section 13. A middle diameter tubular section 12 having a diameter larger than that of the smaller diameter tubular section 11 extends from a proximal end of the flap 19 toward the larger diameter tubular section 14. A distal end of the middle diameter tubular section 12 is formed into a U-turn configuration in an axial direction to provide a folded portion 20. The increasing diameter tubular section 13 is connected to an outer peripheral end of the folded portion 20. Further, a closing flange section 15 protrudes from an inner surface of a distal end of the larger diameter tubular section 14 in a radial direction.

The grommet 10 includes a wire harness passing section 16 having a hollow space on a coaxial line of the smaller diameter tubular section 11, the middle diameter tubular section 12, the increasing diameter tubular section 13, and the larger diameter tubular section 14. As shown in FIGS. 3A to 3E, outer peripheral surfaces on opposite ends of a wire harness W/H passed through the wire harness threading section 16 closely contact with the smaller diameter tubular section 11 and a through-hole 17 in the closing flange section 15.

The larger diameter tubular section 14 is provided on an outer periphery with a vehicle body latching recess 18 in an annular shape.

The flap section 19 spreads conically from the outer periphery of the smaller diameter tubular section 11 toward the increasing diameter tubular section 13. An outer diameter of the flap section 19 is larger than outer diameters of the increasing diameter tubular section 13 and larger diameter tubular section 14. The outer diameter of the flap section 19 in the original conical shape is larger than a diameter of a through-hole 41 in the vehicle body panel 40.

A tape winding piece 21 extends from an open end of the smaller diameter tubular section 11 in the axial direction.

The U-shape folded portion 20 is disposed between the middle diameter tubular section 12 and the increasing diameter tubular section 13 in the axial direction. A folded end 20a of the folded portion 20 protrudes in a space in the increasing diameter tubular section 13.

Figure 2:
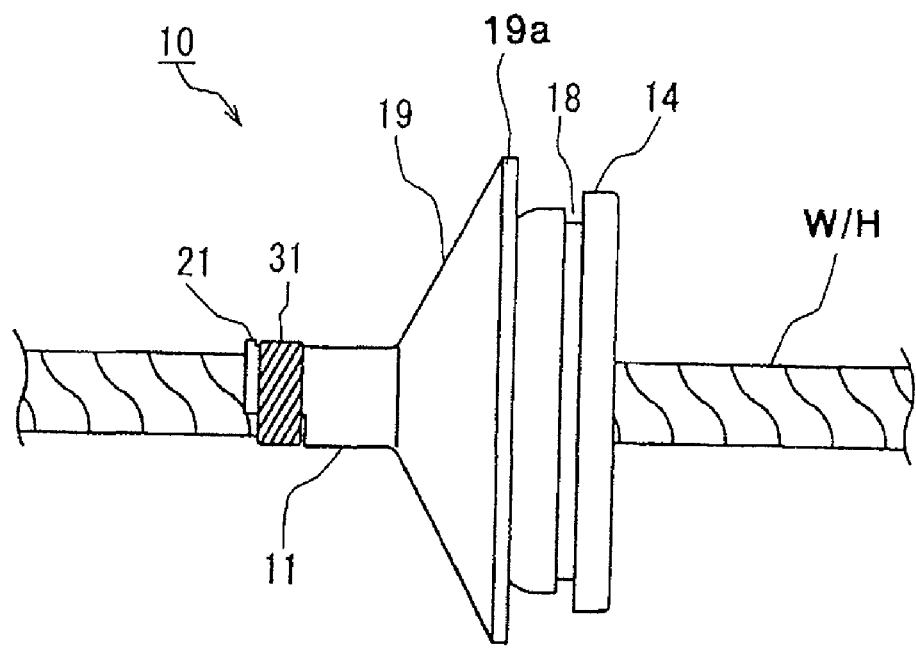
FIG. 2 is a side elevation view of the grommet shown in FIG. 1, illustrating the grommet attached to a wire harness.

A wire harness W/H passes the wire harness passing section 16 of the grommet 10 constructed above. As shown in FIG. 2, a tape 31 is wound around the tape winging piece 21 and the wire harness W/H to position and secure the grommet 10 onto the wire harness W/H.

Under this condition, the grommet 10 is attached to the through-hole 41 in the vehicle body panel 40.

Figure 3:
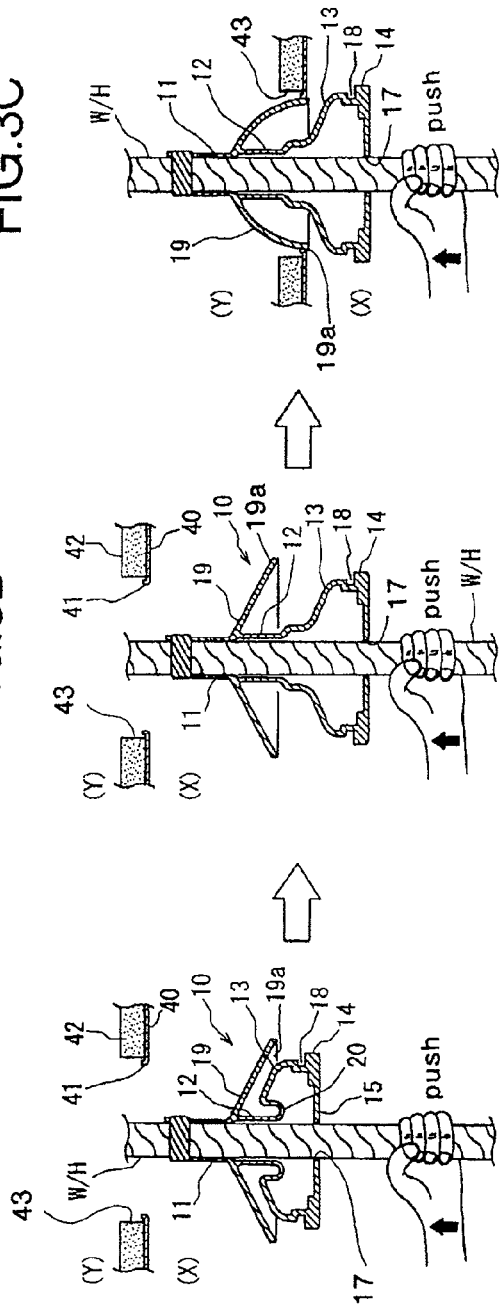
FIGS. 3A to 3E are explanatory section views of a process for attaching the grommet shown in FIG. 2 to a through-hole in a vehicle body.

In order to attach the grommet 10 to the through-hole 41, firstly, as shown in FIG. 3A, a working person at an engine room side X inserts the wire harness W/H into the through-hole 41 toward the passenger room side Y. At this time, the smaller diameter tubular section 11 of the grommet 10 is aimed in a direction shown by an arrow.

Secondly, as shown in FIG. 3B, immediately before the smaller diameter tubular section 11 is inserted into the through-hole 41, the larger diameter tubular section 14 of the grommet 10 is pulled toward the working person and the wire harness W/H is pushed toward the through-hole 41 so that the folded portion 20 is stretched straightly.

When the folded portion 20 is stretched straightly, a distance between the flap section 19 and the increasing diameter tubular section 13 can be widened. Under this condition, when the grommet 10 together with the wire harness is inserted into the through-hole 41, as shown in FIG. 3C, the flap section 19 is deformed inward upon passing the through-hole 41 and passes over the through-hole 41 while the flap section 19 is reducing its diameter. Consequently, the flap section 19 can be inserted into the through-hole 41 smoothly without catching a distal end peripheral edge 19a of the flap section 19 between a peripheral edge around the through-hole 41 and the increasing diameter tubular section 13.

When the grommet 10 is further pushed toward the passenger room side Y, as shown in FIG. 3D, the increasing diameter tubular section 13 is compressed inward and the peripheral edge around the through-hole 41 falls down into the vehicle body latching recess 18 in the larger diameter tubular section 14, thereby engaging the grommet 10 with the through-hole 41. At this time, the whole of the flap section 19 passes the through-hole 41 completely and exists in the passenger room side Y. The flap section 19 returns from a state deformed inward upon passing the through-hole 41 to an original state spreaded outward.

Lastly, as shown in FIG. 3E, while the vehicle body latching recess 18 is being engaged with the peripheral edge around the through-hole 41, the wire harness W/H is pulled into the engine room side X and the folded portion 20, which is stretched straightly, turns to the original folded state. Thus, the flap section 19 that protrudes toward the passenger room side Y is drawn back and the distal end peripheral edge 19a of the flap section 19 can contact with the sound absorbing plate 42 at the passenger room side Y so that the through-hole 41 is closed completely. This can define a sound absorbing space S closed by the sound absorbing plate 42 and the flap section 19.

Thus, the grommet 10 can space the distal end peripheral edge 19a of the flap section 19 from the increasing diameter tubular section 13 by stretching the folded portion 20, and the whole of the flap section 19 can readily pass the through-hole 41, thereby positioning the flap section 19 in the passenger room side Y, without catching the distal end peripheral edge 19a between the peripheral edge around the through-hole 41 and the increasing diameter tubular section 13 and without passing the larger diameter tubular section 14 through the through-hole 41.

When the grommet 10 is further pushed into the through-hole from a position where the flap section 19 is disposed in the passenger room side Y, the increasing diameter tubular section 13 is compressed upon passing the through-hole 41, the peripheral edge around the through-hole 41 falls down into the vehicle body latching recess 18, and the grommet 10 is engaged with the vehicle body panel 40. That is, before the grommet 10 is mounted on the vehicle body panel 40, the working person can push the grommet 10 into the through-hole 41 at the engine room side X by a one-motion manner. It is possible for the working person to easily attach the grommet 10 to the through-hole 41 by a low inserting force, thereby enhancing workability in attachment.

After the vehicle body latching recess 18 is engaged with the peripheral edge around the through-hole 41, when the working person at the engine room side X merely pulls back the wire harness W/H lightly, the folded portion 20 returns to the original state that surrounds the increasing diameter tubular section 13. Consequently, as shown in FIG. 3E, the distal end peripheral edge 19a can contact with the surface of the sound absorbing plate 42. Since the original shape of the folded portion 20 is a shape in which the grommet 10 is molded initially, this contacting condition can be maintained. Further, in the case where a force is applied to the wire harness W/H to pull it into the engine room side X, since the force is directed so that the flat section 19 is brought into contact with the sound absorbing plate 42, it is possible to maintain sound insulation without disconnecting the flap section 19 from the sound absorbing plate 42.

Further, as described above, since serial attaching works shown in FIGS. 3A to 3E can be completed at the engine room side X, only one working person at the engine room side X can finish the serial attaching works and no work is required at the passenger room side Y.

FIG. 4 and FIGS. 5A to 5E show a second embodiment of the grommet 10 in accordance with the present invention.

Figure 4:
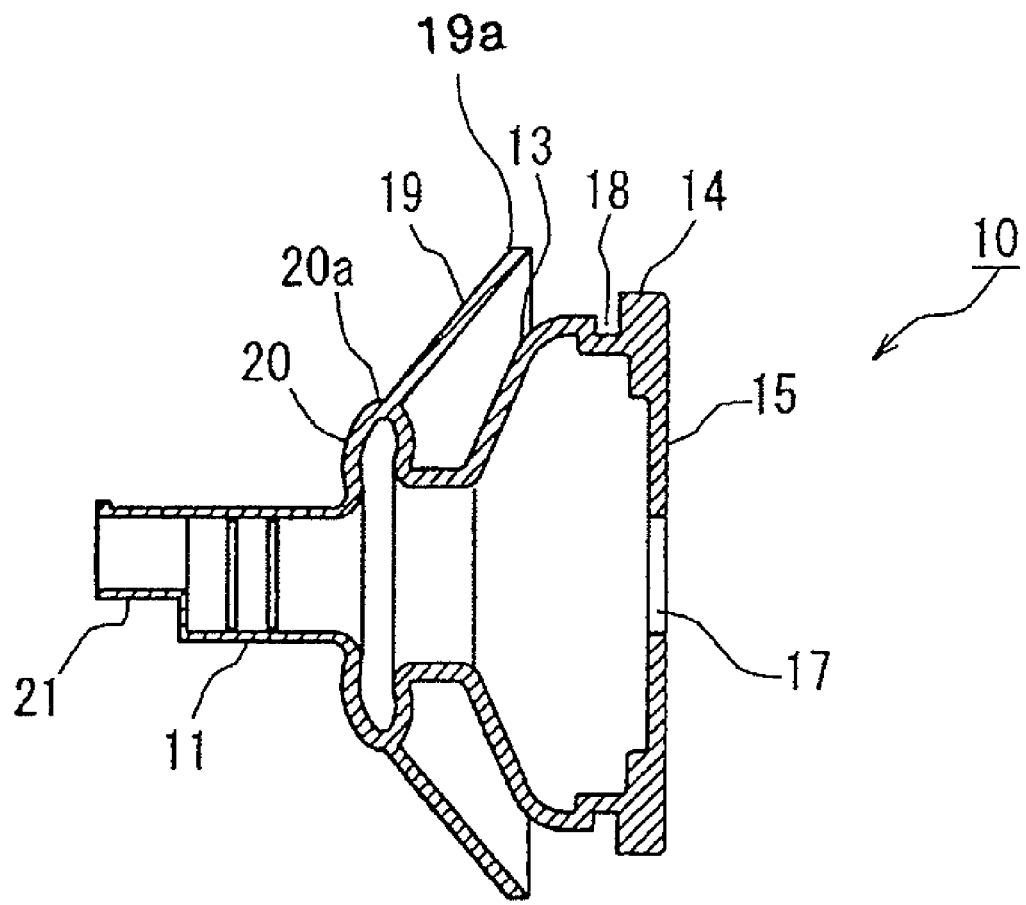
FIG. 4 is a longitudinal section view of a second embodiment of the grommet in accordance with the present invention.

As shown in FIG. 4, a folded portion 20 of the grommet 10 is provided on a connecting portion between the smaller diameter tubular section 11 and the increasing diameter tubular section 13 so that the folded portion 20 protrudes outward in a U-shape in a direction orthogonal to the axial direction. A conical flap section 19 is provided on an outer end 20a of the folded portion 20 to spread toward the increasing diameter tubular section 13.

Since the other structures in the second embodiment are the same as those in the first embodiment, the same signs in the first embodiment are given to the same elements in the second embodiment to omit the redundant explanation.

Figure 5:
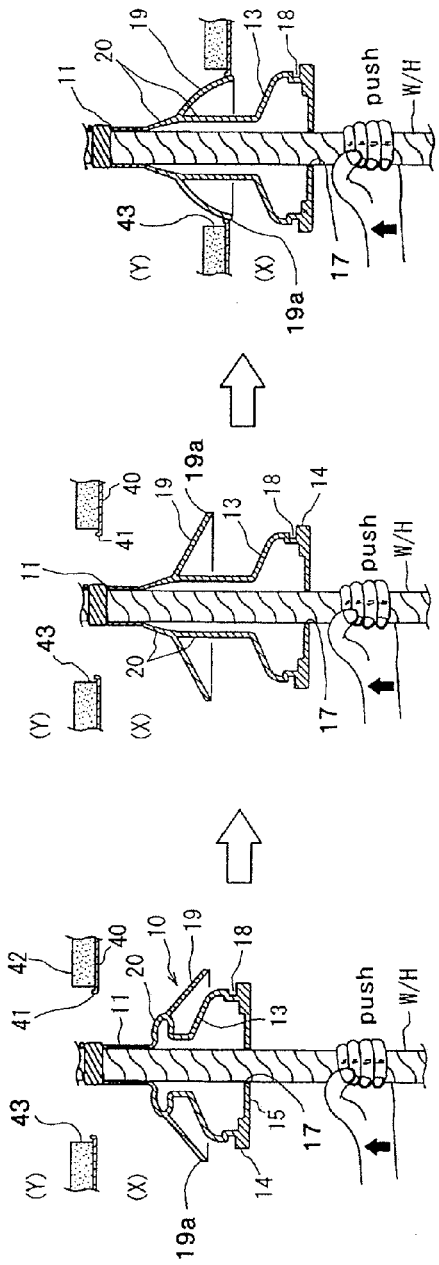
FIGS. 5A to 5E are explanatory section views of a process for attaching the grommet shown in FIG. 4 to the through-hole in the vehicle body.

A process for attaching the grommet in the second embodiment to the through-hole 41 is the same as that in the first embodiment. As shown in FIG. 5A, the smaller diameter tubular section 11 is aimed to and inserted into the through-hole 41 at the engine room side X. As shown in FIG. 5B, immediately before the smaller diameter tubular section 11 is inserted into the through-hole 41, while the larger diameter tubular section 14 is being pulled toward the working person the wire harness W/H is pushed toward the through-hole 41 so that the folded portion 20 is stretched straightly and the whole of the flap section 19 pulled by the stretched, folded portion 20 is reduced in diameter.

As shown in FIG. 5C, under this condition, when the grommet 10 together with the wire harness W/H is inserted into the through-hole 41, the flap section 19 can be inserted into the through-hole 41 smoothly without catching a distal end peripheral edge 19a of the flap section 19 between the peripheral edge around through-hole 41 and the increasing diameter tubular section 13.

When the grommet 10 is further pushed toward the passenger room side Y, as shown in FIG. 5D, the flap section 19 passes the through-hole 41 completely to be disposed at the passenger room side Y and the flap section 19 returns to the original spreaded shape. The peripheral edge around the through-hole 41 falls down in the vehicle body latching recess 18 in the grommet 10.

Finally, as shown in FIG. 5E, the vehicle body latching recess 18 in the larger diameter tubular section 14 is engaged with the peripheral edge around the through-hole 41, the wire harness W/H is pulled in the direction opposite from the pushing direction, the folded portion 20 returns to the original shape, the flap section 19 protruding to the passenger room side Y is pulled back, and the distal end peripheral edge 19a of the flap section 19 is brought into contact with the surface of the sound absorbing plate 42 to close the through-hole 41. Thus, the closed sound insulation space S is defined by the sound absorbing plate 42 and the flap section 19, as is the case with the first embodiment.

As shown in FIG. 5B, since the flap section 19 is temporarily reduced in diameter by being pulled by the stretched folded portion 20 in the grommet 10 of the second embodiment, a catching margin for the peripheral edge around the through-hole 41 is reduced temporarily, and the flap section 19 can easily pass the through-hole 41. Accordingly, it is possible for the flap section 19 to pass the through-hole 41 having a small diameter. Also, since the attaching work can be finished at the engine room side X, as is the case with the first embodiment, only one working person at the engine room side X can carry out the grommet attaching work.

The invention claimed is:

1. A grommet, comprising:
a smaller diameter tubular section, an increasing diameter tubular section, and a larger diameter tubular section, said smaller diameter tubular section being connected through said increasing diameter tubular section to said larger diameter tubular section in an axial direction, said smaller and larger diameter tubular sections configured to pass a wire harness for a motor vehicle therethrough, said grommet configured to be inserted into a through-hole in a vehicle body panel and a latching recess of the large diameter tubular section is engaged with a peripheral edge of said through-hole in the vehicle body panel;
wherein a U-shape folded portion is provided between said smaller diameter tubular section and said increasing diameter tubular section, said folded portion extending outward from said smaller diameter tubular section and turning in an axial direction;
wherein a flap section is provided on an outer periphery of said smaller diameter tubular section so that said flap section spreads conically from said smaller diameter tubular section toward said increasing diameter tubular section; and
wherein said folded portion is stretched flatly when said grommet is inserted into said through-hole, and when said vehicle body latching recess is engaged with said peripheral edge said folded portion returns to its original shape, and a distal end peripheral edge of said flap section contacts with the vehicle body panel at a passenger room side to define a sound absorbing closed space.

2. A grommet, comprising:
a smaller diameter tubular section, an increasing diameter tubular section, and a larger diameter tubular section, said smaller diameter tubular section being connected through said increasing diameter tubular section to said larger diameter tubular section in an axial direction, said smaller and larger diameter tubular sections configured to pass a wire harness for a motor vehicle therethrough, said grommet configured to be inserted into a through-hole in a vehicle body panel and a latching recess of the large diameter tubular section is engaged with a peripheral edge of said through-hole in the vehicle body panel;
wherein a U-shape folded portion is provided between said smaller diameter tubular section and said increasing diameter tubular section, said folded portion protruding outward in a direction orthogonal to an axial direction from said smaller diameter tubular section; wherein a flap section protrudes from an outer end of said folded portion so that said flap section spreads conically toward said increasing diameter tubular section; and wherein said folded portion is stretched flatly when said grommet is inserted into said through-hole, and when said vehicle body latching recess is engaged with said peripheral edge, said folded portion returns to its original shape, and a distal end peripheral edge of said flap section contacts with the vehicle body panel at a passenger room side to define a sound absorbing closed space.

* * * * *